United States Patent
Arumilli et al.

(10) Patent No.: US 9,705,808 B2
(45) Date of Patent: Jul. 11, 2017

(54) FLOW AWARE BUFFER MANAGEMENT FOR DATA CENTER SWITCHES

(71) Applicant: Cisco Technology, Inc., San Jose, CA (US)

(72) Inventors: Subbarao Arumilli, Cupertino, CA (US); Peter Newman, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 202 days.

(21) Appl. No.: 14/221,373

(22) Filed: Mar. 21, 2014

(65) Prior Publication Data

US 2015/0271081 A1    Sep. 24, 2015

(51) Int. Cl.
| | | |
|---|---|---|
| *H04L 12/825* | (2013.01) | |
| *H04L 12/801* | (2013.01) | |
| *G06F 13/38* | (2006.01) | |
| *H04L 12/833* | (2013.01) | |
| *H04L 12/823* | (2013.01) | |
| *H04L 12/863* | (2013.01) | |

(52) U.S. Cl.
CPC ............ *H04L 47/25* (2013.01); *G06F 13/385* (2013.01); *H04L 47/11* (2013.01); *H04L 47/29* (2013.01); *H04L 47/31* (2013.01); *H04L 47/32* (2013.01); *H04L 47/6215* (2013.01); *G06F 2213/3808* (2013.01)

(58) Field of Classification Search
CPC .......... G06F 13/385; G06F 2213/3808; H04L 47/25; H04L 49/9036
USPC ........................................................ 370/235
See application file for complete search history.

(56) References Cited

U.S. PATENT DOCUMENTS

| | | | |
|---|---|---|---|
| 6,788,697 B1 | 9/2004 | Aweya et al. | |
| 2003/0105897 A1* | 6/2003 | Adams | G06F 11/004 |
| | | | 710/52 |
| 2004/0223452 A1* | 11/2004 | Santos | H04L 47/10 |
| | | | 370/229 |
| 2005/0286488 A1* | 12/2005 | Briscoe | H04L 12/14 |
| | | | 370/351 |
| 2006/0056365 A1* | 3/2006 | Das | H04W 28/22 |
| | | | 370/338 |

(Continued)

OTHER PUBLICATIONS

International Search Report and Written Opinion in counterpart International Application No. PCT/US2015/019620, mailed May 28, 2015, 8 pages.

(Continued)

*Primary Examiner* — Stephen J Clawson
(74) *Attorney, Agent, or Firm* — Edell, Shapiro & Finnan, LLC

(57) ABSTRACT

Systems and methods are provided that enable flow aware buffer management. The method includes storing in a queue of a buffer a first type of traffic, storing in the queue of the buffer a second type of traffic, wherein the first type of traffic is less sensitive to latency than the second type of traffic, and when an amount of the first type of traffic meets or exceeds a first threshold, effecting flow control of the first type of traffic to slow a flow of the first type of traffic into the buffer. Flow control can be effected using packet marking or discarding packets. The methodology has particular utility in connection with managing elephant and mouse flows in a network switch.

17 Claims, 6 Drawing Sheets

(56) References Cited

U.S. PATENT DOCUMENTS

| | | | |
|---|---|---|---|
| 2006/0215551 A1* | 9/2006 | Narvaez | H04L 47/10 370/229 |
| 2007/0237082 A1 | 10/2007 | Han | |
| 2009/0067335 A1* | 3/2009 | Pelletier | H04L 41/5025 370/238 |
| 2015/0163145 A1* | 6/2015 | Pettit | H04L 47/125 370/237 |

OTHER PUBLICATIONS

Alizadeh, et al., "Data Center TCP (DCTCP)," SIGCOMM'10, Aug. 30-Sep. 3, 2010, New Delhi, India, 12 pages.

Edsall, et al., "Flame: Efficient and Robust Hardware Load Balancing for Data Center Routers," [Department of Computer Science and Engineering], University of California, San Diego, Jan. 2012, 15 pages.

Alizadeh, et al., "pFabric: Minimal Near-Optimal Datacenter Transport," SIGCOMM'13, Aug. 12-16, 2013, Hong Kong, China, 12 pages.

* cited by examiner

FLOW AWARE BUFFER MANAGEMENT FOR DATA CENTER SWITCHES

TECHNICAL FIELD

The present disclosure relates to data communications and traffic flow through a switching element of an electronic data network.

BACKGROUND

In recent years, data centers have transformed computing services by, among other things, consolidating large scale computer functionality that was formerly realized within the confines of an enterprise and enabling cloud computing services. However, as the use of data centers increases, the costs of running those data centers also increases. At the same time, consumers' demand for ever increasing bandwidth and processing power continues to grow. As a result, data center operators are particularly mindful of the cost of providing data center services, and continue to seek ways to control those costs and maintain customer satisfaction.

Research has demonstrated that of the data communications traffic that traverses a data center, at least two main categories or types of traffic flows can be defined. A first category or type of traffic flow is traffic associated with services such as search requests, social networking, and retail applications, which tend to generate a large number of "small" requests and responses across the data center. This first type of traffic is commonly referred to in the art as "mouse" traffic or "mice flows" and is characterized by applications that demand low latency for each of the short request/response flows. A second category or type of traffic flow is traffic associated with services such as backup, replication, media streaming, data mining, etc., which tend to generate "large" flows across the data center and often provides for continuous updating of internal data structures within the data center This second type of traffic is commonly referred to in the art as "elephant" traffic or "elephant flows" and is characterized by applications that can handle higher latency but generally rely on higher throughput. Significantly, it is not uncommon for elephant flows to "hog" the bandwidth of a given data center, and more particularly the buffer resources in selected switching elements in the data center. More specifically, switching elements within a data center include memory that operates to buffer incoming traffic in connection with determining where traffic should be sent, e.g., determining out of which port of the switching element the incoming data should be sent. However, when a buffer is full as a result of more data having been received than can be properly transmitted or removed from the buffer, new incoming traffic at such a switching element is typically dropped or discarded, resulting in longer overall processing times which, for end point processes, especially end point processes that rely on mice flows, can be particularly detrimental to user experience and thus overall customer satisfaction.

DESCRIPTION OF EXAMPLE EMBODIMENTS

Overview

Systems and methods are provided that enable flow aware buffer management. The method includes storing in a queue of a buffer a first type of traffic, storing in the queue of the buffer a second type of traffic, wherein the first type of traffic is less sensitive to latency than the second type of traffic, and when an amount of the first type of traffic meets or exceeds a first threshold, effecting flow control of the first type of traffic to slow a flow of the first type of traffic into the buffer. Flow control can be effected (i.e., caused to occur) by packet marking or by discarding packets. The methodology has particular utility in connection with managing elephant and mouse flows in a network switch.

Example Embodiments

Figure 1:
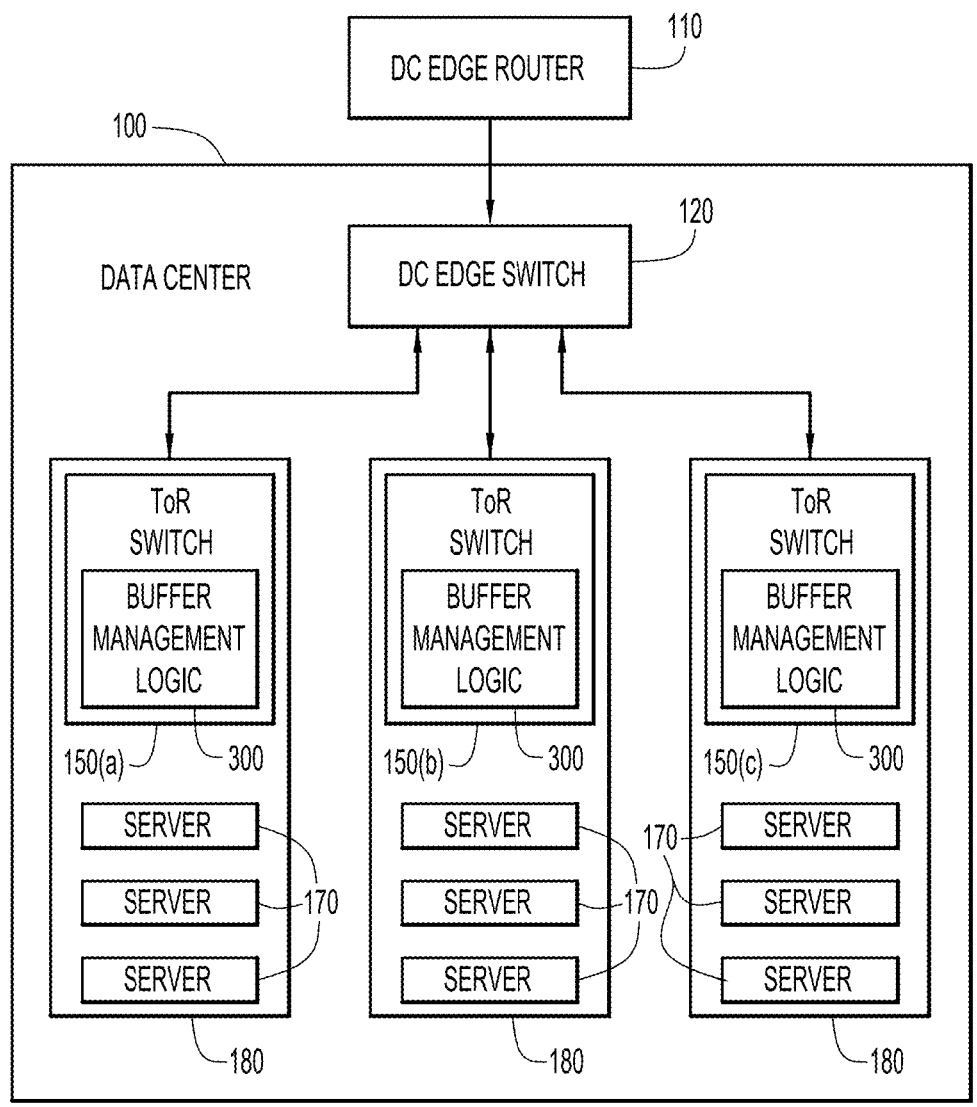
FIG. 1 depicts an example data center architecture including a top of the rack switch that can be configured in accordance with example embodiments described herein.

FIG. 1 depicts a data center architecture including a top of the rack switch that can be configured in accordance with the embodiments described herein. As shown in FIG. 1, a data center 100 may be in communication with, e.g., a data center edge router 110. Data center edge router 110 may be in communication with other routers (not shown) in the same data center, other data centers (not shown), or a cloud computing environment (not shown), among other possible connection possibilities. Data center edge router 110 may be in communication with a data center edge (which may also be considered to be, generally, an end of row or aggregation) switch 120, which, in this particular implementation, is responsible for switching data communication flows among a plurality of servers 170 via top of the rack switches 150 which control flows to and from a plurality of servers 170 disposed in a plurality of racks 180. As shown, each of the racks 180 includes, e.g., a top of the rack switch 150(*a*), 150(*b*), 150(*c*), hereafter 150. Top of the rack switch 150 is responsible, in this particular implementation, to ensure that data communications arriving from data center edge switch 120 are routed to an appropriate server 170 in a given rack 180. Likewise, top of the rack switch 150 is responsible, in this particular implementation, to ensure that data communications arriving from a given server 170 in a given rack 180 are delivered to, e.g., other servers within the same rack 180 or other servers in the data center 120 or to the data center edge router 110.

As will be explained in more detail below, top of the rack switch 150 includes buffer management logic 300 which is configured to better control the amount and type of data that is buffered in a buffer of top of the rack switch 150 in an effort to provide improved quality of service for different forms of data communications, e.g., mice flows and elephant flows. Although the instant description is focused on a top of the rack switch, those skilled in the art will appreciate that the techniques described herein are applicable to any network switching element including data center edge switch 120, or routers, including data center edge router 110. For purposes of this description, top of the rack switch will be referred to hereinafter as, simply, "switch" 150.

In many cases, the data communications mentioned above are implemented with any one of a number of protocols. In the context of this disclosure, Transmission Control Protocol (TCP) is employed to ensure reliable connection between two given processes. That is, TCP is used in combination with the Internet protocol (IP) to send and receive data communications in the form of packets (predetermined groups of bytes) over network connections and, in particular, between two given endpoint processes (e.g., a browser operating on a user computer that is requesting information from a web server, such as one of the servers 170 shown in data center 100).

Figure 2:
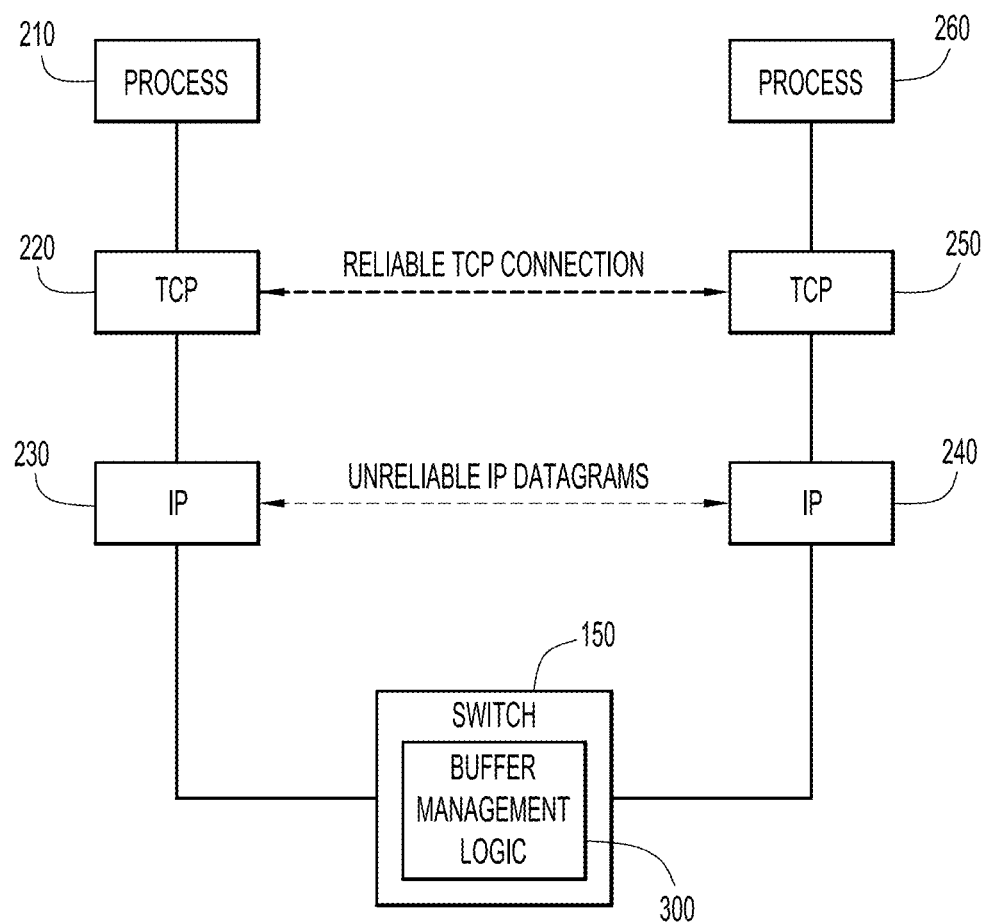
FIG. 2 depicts data communications using Transmission Control Protocol (TCP)/Internet Protocol (IP) via a switch configured in accordance with example embodiments described herein.

Specifically, and with reference to FIG. 2, a process 210 operating on a computer (which could be a server) uses TCP 220 and IP 230 to send data communications to, or receive data communications from, process 260 (also operating on a computer), which similarly uses TCP 250 and IP 240 all via, among other components, switch 150. As further indicated in FIG. 2, TCP 230, 250 enable a reliable connection between the two processes 210, 260, whereas the indicated IP connection is comprised of unreliable IP datagrams.

More specifically, TCP provides a connection-oriented, reliable, byte stream service (whereas IP does not). The term connection-oriented means that two applications (e.g., processes 210, 260) using TCP establish a TCP connection with each other before they exchange data. Reliability is achieved because TCP assigns a sequence number to each packet transmitted, and expects a positive acknowledgment (ACK) from the receiving TCP instance for each packet so received. If the ACK is not received within a timeout interval or period, the data is retransmitted and a data transmission rate may be reduced by the sender TCP instance. The receiving TCP instance uses the sequence numbers to rearrange segments when they arrive out of order, and to eliminate duplicate segments.

The receiving TCP instance, when sending an ACK back to a TCP sender instance, also indicates to the TCP sender instance the number of bytes it can receive beyond the last received TCP segment, without causing overrun or overflow in its internal buffers.

In other words, TCP is configured to enable flow control with respect to data communications. Referring still to FIG. 2, it can be seen that if one or more IP datagrams are not received at, e.g., TCP 250, then TCP 250 will not send an ACK for the missing datagrams back to TCP 220. Notably, it is possible that it is switch 150, itself, that is responsible for failing to properly deliver a given IP datagram to IP 240 resulting in the condition that TCP 250 fails to receive a TCP segment such that TCP 250 fails to return an ACK back to TCP 220.

One reason why switch 150 may fail to deliver a given IP datagram is that a buffer within switch 150 may be filled such that any new traffic that appears at switch 150 is discarded since there is simply no more room in its buffer. One way to address buffer overflow, and thus subsequent packet loss, is to increase the size of the buffer. However, not only is this a more costly solution to address switch buffer overflow, but such a solution may not actually address the underlying problem, which has more to do with the type of traffic being handled by switch 150 than with how much overall traffic is being handled by switch 150. More specifically, and as will be explained more fully below, by keeping track of the extent of elephant flows compared to mice flows in the buffer at a given time, it is possible to effect (i.e., cause) flow control of the elephant flows in a way that reduces or even eliminates TCP timeouts (particularly of mice flows) as a result of failures to receive TCP segments at a TCP receiving instance. As shown in FIG. 2, buffer management logic 300 is provided to manage a buffer of switch 150 to minimize discarding of IP datagrams that result in missing TCP segments and resulting TCP timeouts.

Flow control in accordance with embodiments described herein may be accomplished by purposefully dropping one or more packets or by appropriately marking one or more packets. Whether a packet is dropped inadvertently or purposefully in a TCP connection the result is the same: the sending side of the TCP connection does not receive an ACK and, therefore, may reduce its transmission rate and, at a minimum, retransmit the segment for which the ACK was not received.

Marking may be accomplished by using, e.g., Explicit Congestion Notification (ECN). ECN is an extension to the Internet protocol and to TCP that allows end-to-end notification of network congestion without dropping packets. An ECN-aware network device, such as switch 150 if so configured in accordance with the presently described embodiments, may set a mark in an IP packet header instead of dropping a packet in order to signal impending congestion. The receiver of the IP packet echoes the congestion indication to the sender TCP instance, which reduces its transmission rate as though it detected a dropped packet.

Those skilled in the art will appreciate that TCP is designed to keep increasing its throughput unless it receives feedback. This feedback is either packet loss or ECN marking. It ensures that TCP continually estimates the bandwidth available and uses it. If nothing is done TCP, elephant flows will fill up the switch buffer because that is the natural effect of TCP operations.

Figure 3:
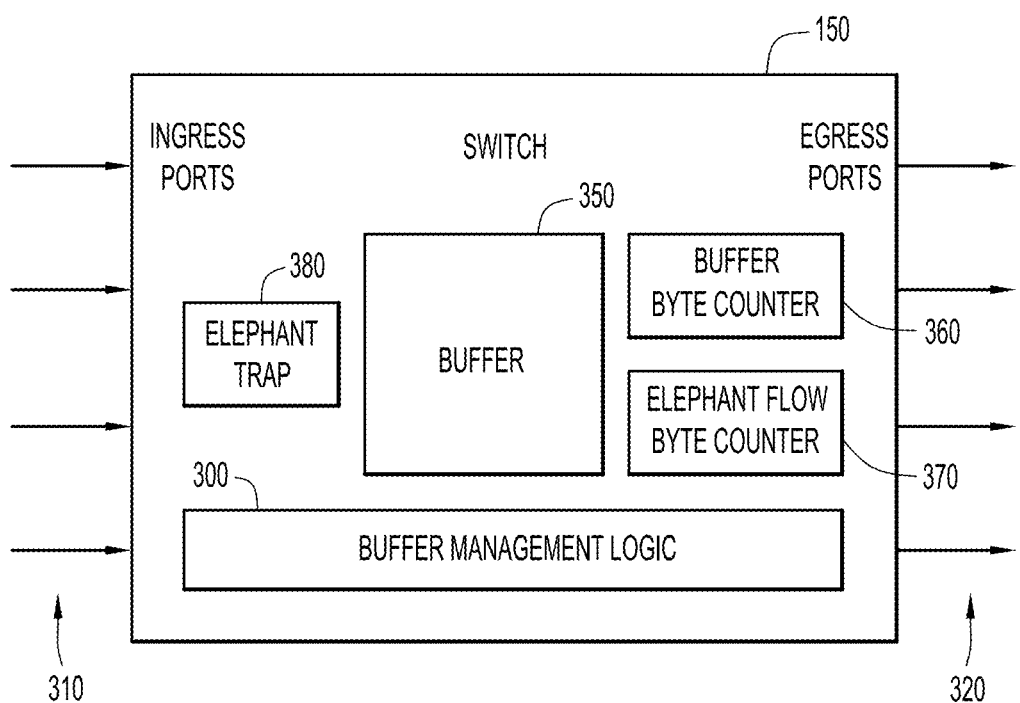
FIG. 3 depicts a switch including a buffer that can be monitored to effect data traffic control mechanisms in accordance with an example embodiment.

Reference is now made to FIG. 3, which depicts switch 150 including a buffer 350 that can be monitored to effect traffic control mechanisms described herein. That is, the methodology described herein causes flow control to be performed before it might otherwise be performed.

As shown, switch 150 includes a plurality of ingress ports 310, a plurality of egress ports 320, buffer 350 and buffer management logic 300. Ingress ports 310 are configured to receive incoming data communications traffic in the form of, e.g., IP datagrams or packets, which can be further deconstructed into a plurality of bytes. Such bytes are then temporarily stored in buffer 350 until switch 150 transmits those bytes out via one or many of the plurality of egress ports As each incoming byte is stored in buffer 350, buffer byte counter 360 is incremented. And, as each byte is removed from buffer 350, buffer byte counter 360 is decremented. As such, buffer byte counter 360 maintains an up-to-date value of the number of bytes stored in buffer 350 at any moment in time.

FIG. 3 also shows elephant trap 380. Elephant trap 380 is configured to determine whether a given incoming data communication flow can be designated as an elephant flow, i.e., a flow that is associated with a service such as backup, replication, or data mining, among others. In other words, elephant trap 380 is configured to distinguish between elephant flows and mice flows. Several designs of elephant traps can be implemented in connection with the methodology describe herein. One possible design uses a bloom filter. Another design hashes flows into a table and counts idle periods greater than some duration. Still another possible design defines elephant flows based on the number of packets in a sampled window of time. In yet another possible implementation, elephant trap 380 operates at ingress ports 310 and when an elephant flow is detected, elephant trap 380 generates an indication representative of the elephant flow that is passed to egress ports 320 as appropriate via, e.g., a descriptor block. The particular design of elephant trap 380 is not critical, as long as the design can effectively identify elephant flows, and/or distinguish between elephant flows and mice flows.

By designating a given data communications flow as an elephant flow (using elephant trap 380), it is thus possible to maintain elephant flow byte counter 370. Just like buffer byte counter 360, elephant flow byte counter 380 maintains an up-to-date byte count of bytes, but in this case the byte count is associated with elephant flows identified by elephant trap 380 and stored in buffer 350 at any moment in time.

Since buffer 350 of switch 150 is often filled with traffic (bytes) associated with elephant flows (because, by nature, such flows are more byte intensive), buffer management logic 300 is employed to better control the elephant flows via some form of control loop, e.g., by pre-emptively discarding or marking packets of the elephant flows before the elephant flows fill buffer 350 leaving no room for mice flows, which, as noted, are more sensitive to latency issues.

More specifically, once the amount of buffer consumed by elephant flows exceeds a mark threshold, congestion feedback, e.g., ECN, may be issued on all departing packets belonging to the elephant flows. If the amount of buffer consumed by the elephant flows exceeds a discard threshold (e.g., greater than the mark threshold), arriving packets belonging to the elephant flows are discarded. In one implementation, the marking and/or discarding of packets may be performed probabilistically.

Figure 4:
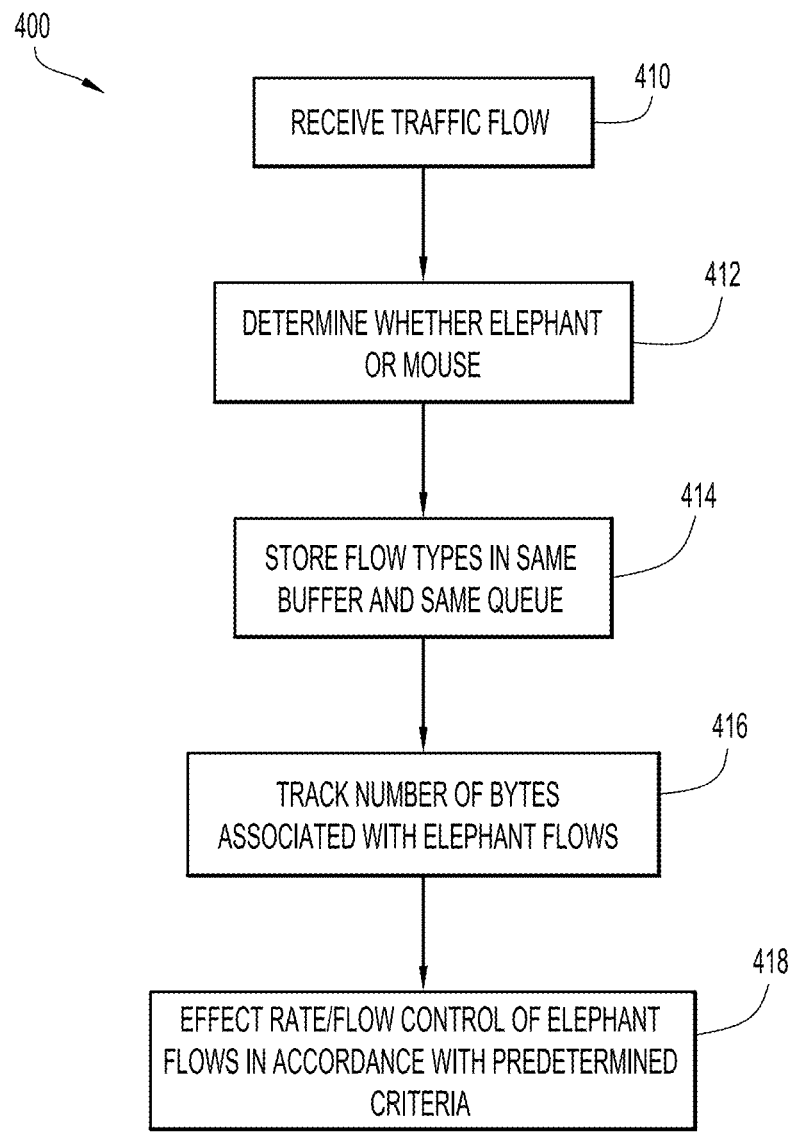
FIG. 4 is a flow chart depicting example operations for effecting buffer management in accordance with example embodiments described herein.
Figure 5:
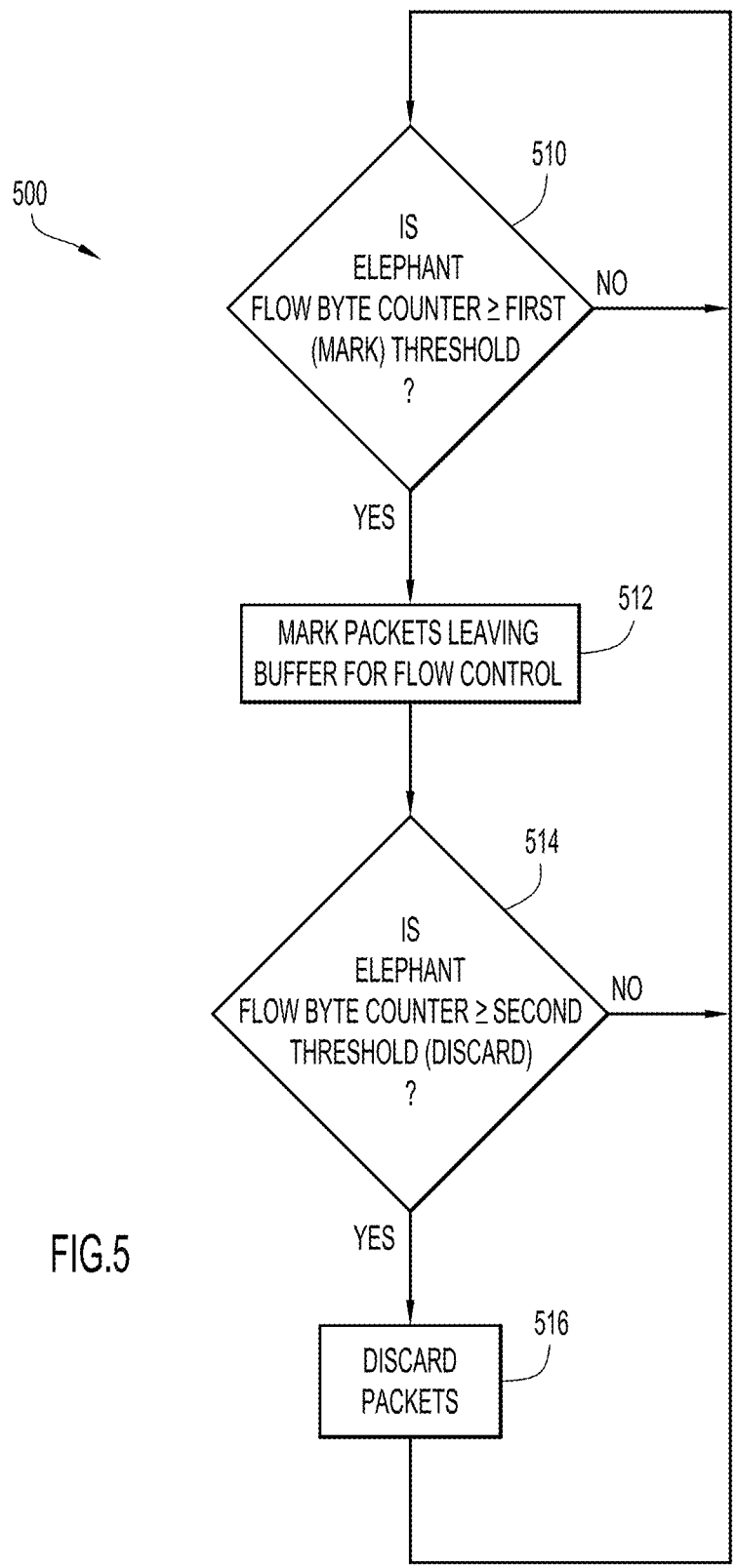
FIG. 5 is another flow chart depicting example operations for effecting buffer management in accordance with example embodiments described herein.

Reference is now made to FIGS. 4 and 5 for a more detailed description of the foregoing. FIG. 4 depicts a series of operations 400 that may be performed by switch 150 in combination with buffer management logic 300. At 410, data communications traffic is received at, e.g., switch 150. At 412, it is determined whether the received data communications traffic should be considered an elephant flow (as opposed to a mouse flow). Optionally, an indicator that a given flow is an elephant flow may be stored in a packet descriptor associated with the flow. At 414, bytes associated with the data communications traffic are stored in buffer 350 of switch 150. Notably, whether the traffic is considered an elephant flow or a mouse flow at this point, the bytes associated with the traffic are stored together in the same buffer and the same logical queue such that the order in which the packets are received will be the same order in which they exit the switch. At 416, the number of bytes associated with elephant flows, is kept track of using, e.g., counter 370. With that information, buffer management logic 300, at 418, effects rate control of elephant flows in accordance with predetermined criteria. In one possible implementation, and as mentioned above, the predetermined criteria may be counter threshold values that cause packets egressing switch 150 to be marked (using, e.g., ECN), or that cause subsequently received packets to be discarded even before they are stored in the buffer.

FIG. 5 illustrates a series of operations 500 that may be performed by, e.g., buffer management logic 300. Operations 500 may be considered to be, for example, a more detailed implementation of operation 418 of FIG. 4. As shown in FIG. 5, it is determined at 510 whether the elephant flow byte counter is greater than a first (mark) threshold. If not, then operation 510 is repeated. The frequency with which operations 500 are performed may be as often as counter values in the counters change, i.e., as bytes/packets arrive and depart switch 150. That is, every time either of counters 360, 370 changes values, operation 510, among other possible operations in the series of operations 500, may be performed. Alternatively, the frequency can be configured as one every 10 μs, 100 μs, etc., as may be appropriate.

If at 510 the elephant flow byte counter is greater than the first threshold, then at 512 packets (or bytes) leaving the buffer are marked for rate or flow control. ECN, for example, may be used for marking packets. In one implementation, marking is performed probabilistically such that, e.g., one out of every 100 packets is marked (as opposed to, e.g., marking every packet). Further, the rate at which marking is performed may be increased as the count value in the elephant flow byte counter becomes increasingly greater than the first threshold. That is, instead of one out of every 100 packets being marked, two out of every 100 hundred packets can be marked if the count value in the elephant flow byte counter is greater than another threshold. In this way, dynamic and increased throttling of elephant flows can be achieved as those elephant flows attempt to fill the buffer (leaving little to no room for mouse flows).

At 514, it is determined whether the value of the elephant flow byte counter is greater than a second (e.g., discard) threshold. If it is not, then operation 510 is repeated. If the value of the elephant flow byte counter is greater than the second (e.g., discard) threshold, then at 516 packets (i.e., packets and related bytes associated with elephant flows) are discarded such that they are not stored in the buffer at all. In one implementation, discarding is performed probabilistically such that, e.g., one out of every 100 packets is discarded (as opposed to, e.g., discarding every packet). Further, the rate at which discarding is performed may be increased as the count value in the elephant flow byte counter becomes increasingly greater than the second threshold. That is, if elephant flow byte counter is greater than a third or fourth, etc. discard threshold, then two, or three, or more packets out of every 100 packets can be discarded (or, even, all packets can be discarded). In this way, increased throttling of elephant flows can be achieved as those elephant flows attempt to fill the buffer (leaving little to no room for mouse flows).

It should be pointed out that the several thresholds (i.e., one or more of each of mark and discard) described herein can be user configurable parameters. In this way, a data center administrator can monitor the type of data communications traffic that traverses a given data center and then set the thresholds and any associated probabilities accordingly.

It should be noted that whenever ECN is not available or implemented, for example, the methodology described herein can rely exclusively on forcing dropped packet to achieve the desired limit to elephant flows stored in buffer 350.

By operating a switch in the manner described above, TCP timeouts are avoided without requiring large buffers to be incorporated into data center switch designs.

Further, a switch configured in the manner described does not suffer from out of order delivery issues when a given flow is classified as an elephant or mouse as changes in queues need not be implemented. That is, flows are placed in the same buffer and same queue. Separate queuing for mice and elephant flows is unnecessary. Further still, latency for mouse flows is addressed as a sufficient amount of buffer space is maintained by effectively controlling the elephant flows.

Finally, as indicated, the buffer flow control approach described herein relies substantially on two counters only, namely an overall buffer byte counter and an elephant flow byte counter. Thus, compared to a buffer that already includes an overall buffer counter, the implementation described herein does not add significant complexity or overhead to switch design.

A side benefit of the described approach is that it can help to avoid TCP "slow start." TCP slow start impacts mice flows since such flows involve multiple round trip delays to complete a given transfer. With the instant methodology, mice flows are treated better as there should be sufficient room maintained in the buffer. Accordingly, TCP can start full speed (in a given window) to complete mice flows faster.

Although, the description above is directed to monitoring elephant flows in a switch buffer, those skilled in the art will appreciate that the same techniques can be applied to mice flows, or any other data communication flow that can be distinguished among a plurality of different types of flows. In other words, a switch can be configured to control packets/bytes of mice flows (or other flows) using one or more marking thresholds and/or one or more discard thresholds, and the extent to which marking and/or discarding occurs can be probabilistically applied.

Figure 6:
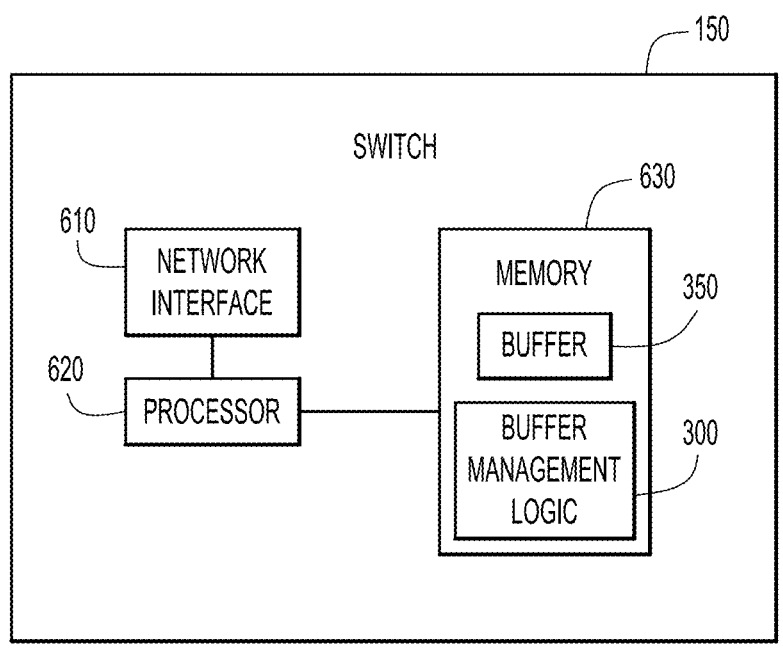
FIG. 6 depicts one possible implementation of a switch that operates in accordance with example embodiments described herein.

Reference is now made to FIG. 6, which shows an example block diagram of switch 150 configured to implement flow aware buffer management according to the techniques described herein. Switch 150 comprises a network interface 610, a processor 620 and memory 630. Network interface 610 is configured to receive input data for storage in buffer 350, and is further configured to output data from buffer 350. The network interface 610 includes a plurality of ports (not shown) at which incoming packets are received and from which outgoing packets are sent.

Processor 620 may be a microprocessor or microcontroller that is configured to execute program logic instructions for carrying out various operations and tasks described herein. For example, processor 620 can execute buffer management logic 300 stored in memory 630 (as, e.g., software) in order to perform the buffer management techniques described herein. The memory 630 may comprise read only memory (ROM), random access memory (RAM), magnetic storage media, optical storage media, flash memory, electrical, or other physical/tangible (non-transitory) memory.

The functions of processor 620 may be implemented by logic encoded in one or more non-transitory tangible computer readable media (e.g., embedded logic such as an application specific integrated circuit, digital signal processor instructions, software that is executed by a processor, etc.) wherein memory 630 stores data used for the operations described herein and stores software or processor executable instructions that are executed to carry out the operations described herein.

Buffer management logic 300 may take any of a variety of forms, so as to be encoded in one or more non-transitory tangible computer readable memory media or storage device (e.g., memory 630) for execution, such as fixed logic or programmable logic (e.g., software/computer instructions executed by a processor). In some embodiments, processor 620 is an application specific integrated circuit (ASIC) that includes fixed digital logic, programmable logic, or a combination thereof. For example, processor 620 may be embodied in digital logic gates in a fixed or programmable digital logic integrated circuit, where the digital logic gates are configured to perform instructions of the buffer management logic 300. In another form, buffer management logic 300 may be embodied in one or more tangible computer readable storage media encoded with software comprising computer executable instructions that when executed are operable to perform the operations described herein.

In sum, embodiments described here are directed to systems and methods to enable flow aware buffer management. The method includes storing in a queue of a buffer a first type of traffic, storing in the queue of the buffer a second type of traffic, wherein the first type of traffic is less sensitive to latency than the second type of traffic, and when an amount of the first type of traffic meets or exceeds a first threshold, effecting flow control of the first type of traffic to slow a flow of the first type of traffic into the buffer. Flow control can be effected by packet marking or by discarding packets. The methodology has particular utility in connection with managing elephant and mouse flows in a network or data center switch.

Although the apparatus, system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. A Data Center can represent any location supporting capabilities enabling service delivery that are advertised. A Provider Edge Routing Node represents any system configured to receive, store or distribute advertised information as well as any system configured to route based on the same information. Accordingly, it is appropriate that the appended claims be construed broadly and in a manner consistent with the scope of the apparatus, system, and method, as set forth in the following.

What is claimed is:

1. A method comprising:
   storing in a queue of a buffer a first type of traffic;
   storing in the queue of the buffer a second type of traffic, wherein the first type of traffic is less sensitive to latency than the second type of traffic;
   maintaining a first counter indicative of a total number of bytes stored in the buffer, and maintaining a second counter indicative of a total number of bytes stored in the buffer that are attributable to the first type of traffic, wherein the second counter is responsive to an indication that is generated by a trap configured to detect the first type of traffic and that is passed via a descriptor block; and
   when, based on a value of the second counter, an amount of the first type of traffic meets or exceeds a first threshold, effecting flow control of the first type of traffic to slow a flow of the first type of traffic into the buffer,
   wherein effecting flow control of the first type of traffic comprises effecting flow control of the first type of traffic in accordance with a first probability when the amount of the first type of traffic meets or exceeds the first threshold, and effecting flow control of the first type of traffic in accordance with a second probability, higher than the first probability, when the amount of the first type of traffic meets or exceeds a second threshold, and
   wherein a frequency with which effecting flow control is performed is set separately from a timing of ingress and egress of packets into and out of the buffer.

2. The method of claim 1, wherein effecting flow control of the first type of traffic comprises marking packets associated with the first type of traffic.

3. The method of claim 2, wherein marking comprises marking packets associated with the first type of traffic flow according Explicit Congestion Notification (ECN).

4. The method of claim 1, wherein effecting flow control of the first type of traffic comprises discarding packets associated with the first type of traffic.

5. The method of claim 1, wherein effecting flow control of the first type of traffic comprises effecting flow control of the first type of traffic in a first predetermined manner when the amount of the first type of traffic meets or exceeds the first threshold, and effecting flow control of the first type of traffic in a second predetermined manner when the amount of the first type of traffic meets or exceeds a third threshold.

6. The method of claim 5, wherein the first predetermined manner comprises marking packets and the second predetermined manner comprises discarding packets.

7. The method of claim 1, wherein the frequency with which effecting flow control is performed is every 10 μs.

8. The method of claim 1, wherein the frequency with which effecting flow control is performed is every 100 μs.

9. An apparatus comprising:
a network interface configured to communicate over a network;
a memory including a buffer; and
a processor communicatively coupled to the network interface and the memory,
wherein the processor is configured to:
store in a queue of the buffer a first type of traffic received via the network interface;
store in the queue of the buffer a second type of traffic received via the network interface, wherein the first type of traffic is less sensitive to latency than the second type of traffic;
maintain a first counter indicative of a total number of bytes stored in the buffer, and maintain a second counter indicative of a total number of bytes stored in the buffer that are attributable to the first type of traffic, wherein the second counter is responsive to an indication that is generated by a trap configured to detect the first type of traffic and that is passed via a descriptor block; and
when an amount of the first type of traffic meets or exceeds a first threshold, effect flow control of the first type of traffic to slow a flow of the first type of traffic into the buffer by effecting flow control of the first type of traffic in accordance with a first probability when the amount of the first type of traffic meets or exceeds the first threshold, and effecting flow control of the first type of traffic in accordance with a second probability, higher than the first probability, when the amount of the first type of traffic meets or exceeds a second threshold, and
wherein a frequency with which effecting flow control is performed is set separately from a timing of ingress and egress of packets into and out of the buffer.

10. The apparatus of claim 9, wherein the processor is further configured to:
effect flow control of the first type of traffic by marking packets associated with the first type of traffic.

11. The apparatus of claim 10, wherein the processor is further configured to:
mark packets associated with the first type of traffic flow according Explicit Congestion Notification (ECN).

12. The apparatus of claim 9, wherein the processor is further configured to:
effect flow control of the first type of traffic by discarding packets associated with the first type of traffic.

13. The apparatus of claim 9, wherein the processor is further configured to:
effect flow control of the first type of traffic by effecting flow control of the first type of traffic in a first predetermined manner when the amount of the first type of traffic meets or exceeds the first threshold, and by effecting flow control of the first type of traffic in a second predetermined manner when the amount of the first type of traffic meets or exceeds a third threshold.

14. The apparatus of claim 9, wherein the first predetermined manner comprises marking packets and the second predetermined manner comprises discarding packets.

15. One or more computer readable non-transitory storage media encoded with software comprising computer executable instructions and when the software is executed operable to:
store in a queue of a buffer of a switch a first type of traffic;
store in the queue of the buffer a second type of traffic, wherein the first type of traffic is less sensitive to latency than the second type of traffic;
maintain a first counter indicative of a total number of bytes stored in the buffer, and maintain a second counter indicative of a total number of bytes stored in the buffer that are attributable to the first type of traffic, wherein the second counter is responsive to an indication that is generated by a trap configured to detect the first type of traffic and that is passed via a descriptor block; and
when an amount of the first type of traffic meets or exceeds a first threshold, effect flow control of the first type of traffic to slow a flow of the first type of traffic into the buffer by effecting flow control of the first type of traffic in accordance with a first probability when the amount of the first type of traffic meets or exceeds the first threshold, and effecting flow control of the first type of traffic in accordance with a second probability, higher than the first probability, when the amount of the first type of traffic meets or exceeds a second threshold, and
wherein a frequency with which effecting flow control is performed is set separately from a timing of ingress and egress of packets into and out of the buffer.

16. The computer readable non-transitory storage media of claim 15, wherein the instructions are further operable to:
effect flow control of the first type of traffic by effecting flow control of the first type of traffic in a first predetermined manner when the amount of the first type of traffic meets or exceeds the first threshold, and by effecting flow control of the first type of traffic in a second predetermined manner when the amount of the first type of traffic meets or exceeds a third threshold.

17. The computer readable non-transitory storage media of claim 15, wherein the first predetermined manner comprises marking packets and the second predetermined manner comprises discarding packets.

* * * * *